US007656308B2

(12) United States Patent
Atkins

(10) Patent No.: US 7,656,308 B2
(45) Date of Patent: Feb. 2, 2010

(54) AC POWERED WIRELESS CONTROL 3-WAY LIGHT SWITCH TRANSMITTER

(75) Inventor: Barry L. Atkins, Goodletsville, TN (US)

(73) Assignee: HeathCo LLC, Elmhurst, IL (US)

( * ) Notice: Subject to any disclaimer, the term of this patent is extended or adjusted under 35 U.S.C. 154(b) by 400 days.

(21) Appl. No.: 10/975,652

(22) Filed: Oct. 28, 2004

(65) Prior Publication Data

US 2006/0097890 A1 May 11, 2006

(51) Int. Cl.
*G08C 19/00* (2006.01)
*G05B 11/01* (2006.01)

(52) U.S. Cl. ............................ 340/825.72; 340/825.69; 340/310.11; 323/320; 315/312

(58) Field of Classification Search ............ 340/825.72, 340/825.69, 310.11, 539, 825.22, 310.01; 348/143; 307/125, 31; 324/663; 310/314, 310/311; 200/330-331; 323/320, 322, 270; 315/312, 295
See application file for complete search history.

(56) References Cited

U.S. PATENT DOCUMENTS

| | | | | |
|---|---|---|---|---|
| 3,590,271 | A | 6/1971 | Peters | |
| 3,971,028 | A | 7/1976 | Funk | |
| D256,011 | S | 7/1980 | Matsuda | |
| 4,242,614 | A | 12/1980 | Vatis et al. | |
| 4,355,309 | A * | 10/1982 | Hughey et al. | 340/825.53 |
| 4,398,178 | A * | 8/1983 | Russ et al. | 307/3 |
| 4,523,128 | A | 6/1985 | Stamm et al. | |
| 4,684,822 | A | 8/1987 | Angott | |
| 4,691,341 | A | 9/1987 | Knoble et al. | |
| 4,746,809 | A * | 5/1988 | Coleman et al. | 307/1 |
| 4,935,736 | A * | 6/1990 | Meierdierck | 340/825.69 |
| 5,099,193 | A | 3/1992 | Moseley et al. | |
| 5,163,112 | A * | 11/1992 | Lefevre et al. | 385/19 |
| 5,189,412 | A * | 2/1993 | Mehta et al. | 340/825.22 |
| 5,194,858 | A * | 3/1993 | Erwin | 340/825.7 |
| 5,254,908 | A | 10/1993 | Alt et al. | |
| 5,264,761 | A | 11/1993 | Johnson | |
| D353,798 | S | 12/1994 | Bryde et al. | |
| 5,455,464 | A | 10/1995 | Gosling | |
| 5,541,584 | A * | 7/1996 | Mehta et al. | 340/825.57 |
| 5,598,042 | A | 1/1997 | Mix et al. | |
| 5,637,930 | A | 6/1997 | Rowen et al. | |
| 5,689,261 | A | 11/1997 | Mehta et al. | |
| D394,042 | S | 5/1998 | Hwang | |
| 5,798,581 | A * | 8/1998 | Keagy et al. | 307/115 |
| 5,867,017 | A * | 2/1999 | Merwin et al. | 323/320 |
| D408,792 | S | 4/1999 | Hwang | |

(Continued)

*Primary Examiner*—Brian A Zimmerman
*Assistant Examiner*—Nam V Nguyen
(74) *Attorney, Agent, or Firm*—Fitch Even Tabin & Flannery

(57) ABSTRACT

An AC line powered RF transmitter light switch is described. The RF transmitter light switch is installed within a 3-way wall switch circuit thereby allowing direct and constant electrical connection of the RF transmitter light switch and the RF receiving light switch. The RF transmitter light switch is in RF communication with the receiving light switch to control the circuit load or light fixture. The RF receiving light switch is in direct electrical connection to the load and acts as a master controller regarding of the position of the RF transmitter light switch even though the RF transmitter light switch is installed within the 3-way wall switch circuit.

42 Claims, 8 Drawing Sheets

U.S. PATENT DOCUMENTS 5,905,442 A 5/1999 Mosebrook et al.
5,920,156 A * 7/1999 Carson et al. ............... 315/317
5,986,358 A * 11/1999 Hsieh ......................... 307/117
6,107,938 A 8/2000 Du et al.
6,114,812 A * 9/2000 Lee ............................ 315/158
6,120,262 A * 9/2000 McDonough et al. .... 417/424.1
6,169,377 B1 * 1/2001 Bryde et al. ................ 315/294
6,174,073 B1 1/2001 Regan et al.
D450,043 S 11/2001 Mosebrook
RE38,069 E 4/2003 Posa
6,545,434 B2 4/2003 Sembhi et al.
6,570,493 B1 * 5/2003 Rotem ................... 340/310.11
6,891,284 B2 * 5/2005 Tilley ......................... 307/116

* cited by examiner

AC POWERED WIRELESS CONTROL 3-WAY LIGHT SWITCH TRANSMITTER

TECHNICAL FIELD

The present invention relates to an AC powered wireless control 3-way light switch transmitter which is wired into a 3-way light switch circuit but which controls the light fixture or load through RF communication to a RF receiver light switch in the same 3-way light switch circuit.

PRIOR ART

Many different light control systems are available and known in the prior art. These systems include use of a master switch which utilizes communications over a 60 Hz power line (AC line carrier technology) which may also include AC switching devices that can respond to the power line commands and control the load. The slave companion switch can be a pushbutton or other actuation switch that feeds AC power line commands to the master switch and respond accordingly. However, such systems require that the switches be connected together in the same circuit, generate line carrier commands or signals across the voltage supply line, may require the use of filters and other line conditioners for accurate communication and they also generate undesirable feedback and interference through the use of AC line carrier communication. These types of AC line carrier load control switches have also been paired with AC powered base stations that may have an RF receiver, the base station responsive to a handheld remote operable light control RF transmitter and forwarding commands to the AC line carrier load control switch through AC line carrier commands.

Other switches are additionally known wherein the master or controlling switch has an RF receiver for receiving RF commands from battery powered handheld devices. Such RF receiving and load control switches suffer from many drawbacks, including the necessity of having a separate handheld battery powered RF transmitter, the inability to fully integrate an RF receiving switch into a normalized 3 way wall switch circuit as well as the inability to fully incorporate all light control functionality into the load control switch. Such systems are described in U.S. Pat. Nos. 5,905,442, 5,455,464 and 5,099,193, among others.

Prior art devices also allow direct control of light fixtures by handheld remote RF or IR command. These systems allow the light fixture output to be modified by remote control battery operated handheld devices or similar transmitters wherein the light fixture control operates at the actual fixture, typically with an RF or command receiver placed in series between or directly connected to the light fixture power supply and the RF or IR receiver. Such devices can be found and described in U.S. Reissue RE38,069, U.S. Pat. Nos. 6,174,073, U.S. Pat. No. 6,107,938, U.S. Pat. No. 5,689,261, U.S. Pat. No. 5,598,042 and U.S. Pat. No. 4,684,822 among others.

DETAILED DESCRIPTION OF THE PREFERRED EMBODIMENT

Figure 1:
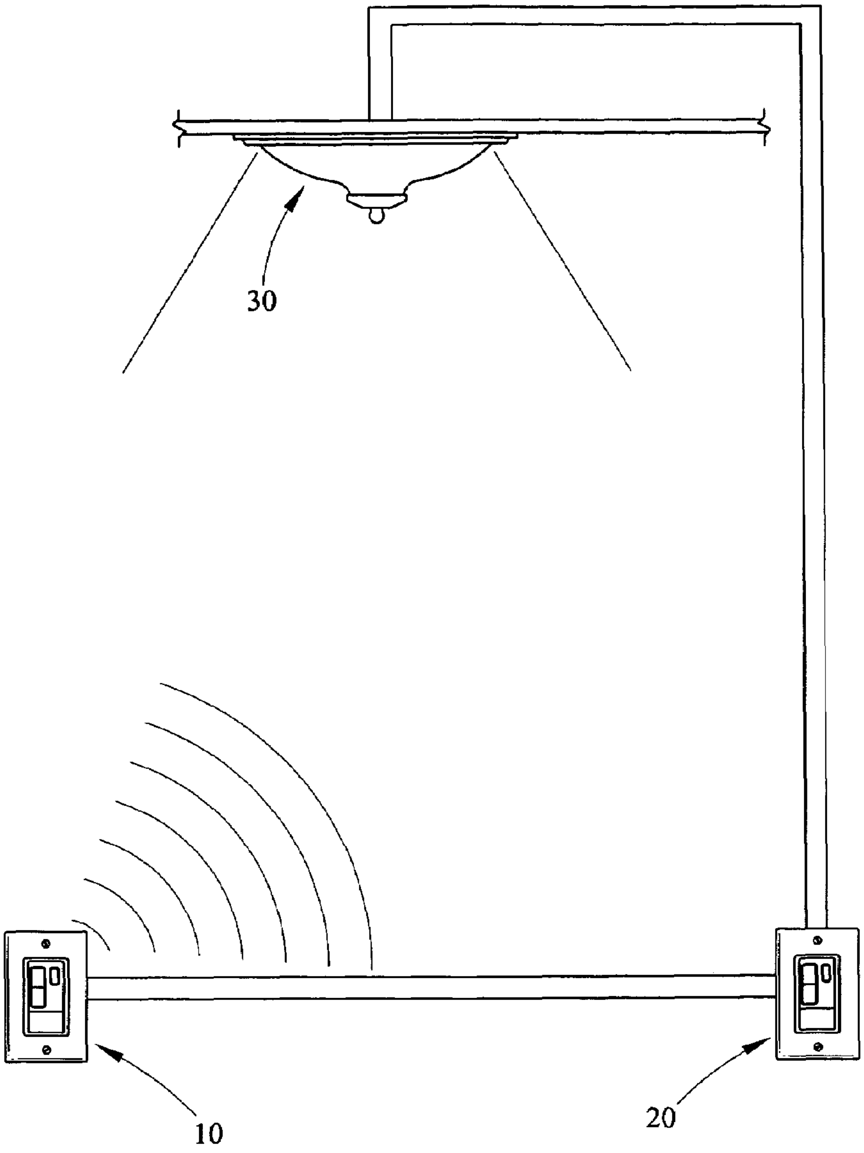
FIG. 1 is a schematic view of the AC powered wireless control 3-way light switch transmitter shown in a 3-way wall switch circuit.
Figure 2A:
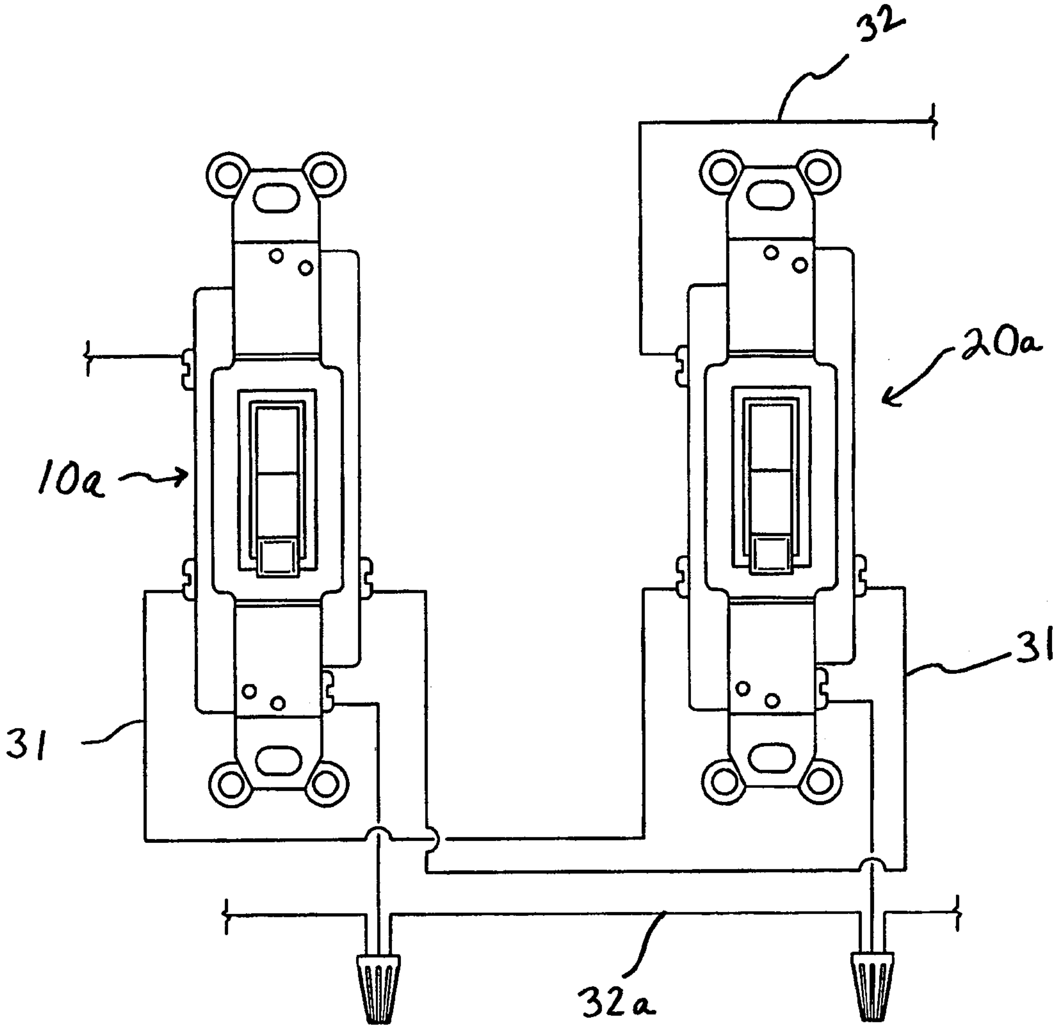
FIG. 2A (PRIOR ART)
FIG. 2A is a circuit diagram for a typical 3-way wiring circuit.

As depicted in FIG. 1, a 3-way wall switch circuit is shown wherein the light fixture or load 30 can be controlled by the remote AC line powered RF transmitter switch 10 or alternatively by RF receiver switch 20. As has been typically done in prior art 3-way wall switch circuits, particularly as are shown in FIG. 2A, a first and a second 3-way switch 10*a*, 20*a* are utilized with an interconnecting travel wire 31 to control the load or light fixtures on load line 32 along with ground 32. In this standard 3-way wall switch circuit, either of the 3-way switches depicted 10*a*, 20*a* in the diagram of FIG. 2A can directly control the current to the light fixture and, one of the switches when opening the switch, can cut off electrical power to the alternate 3-way switch. However, both switches will directly control the circuit by either opening or closing the circuit to the load.

Figure 2B:
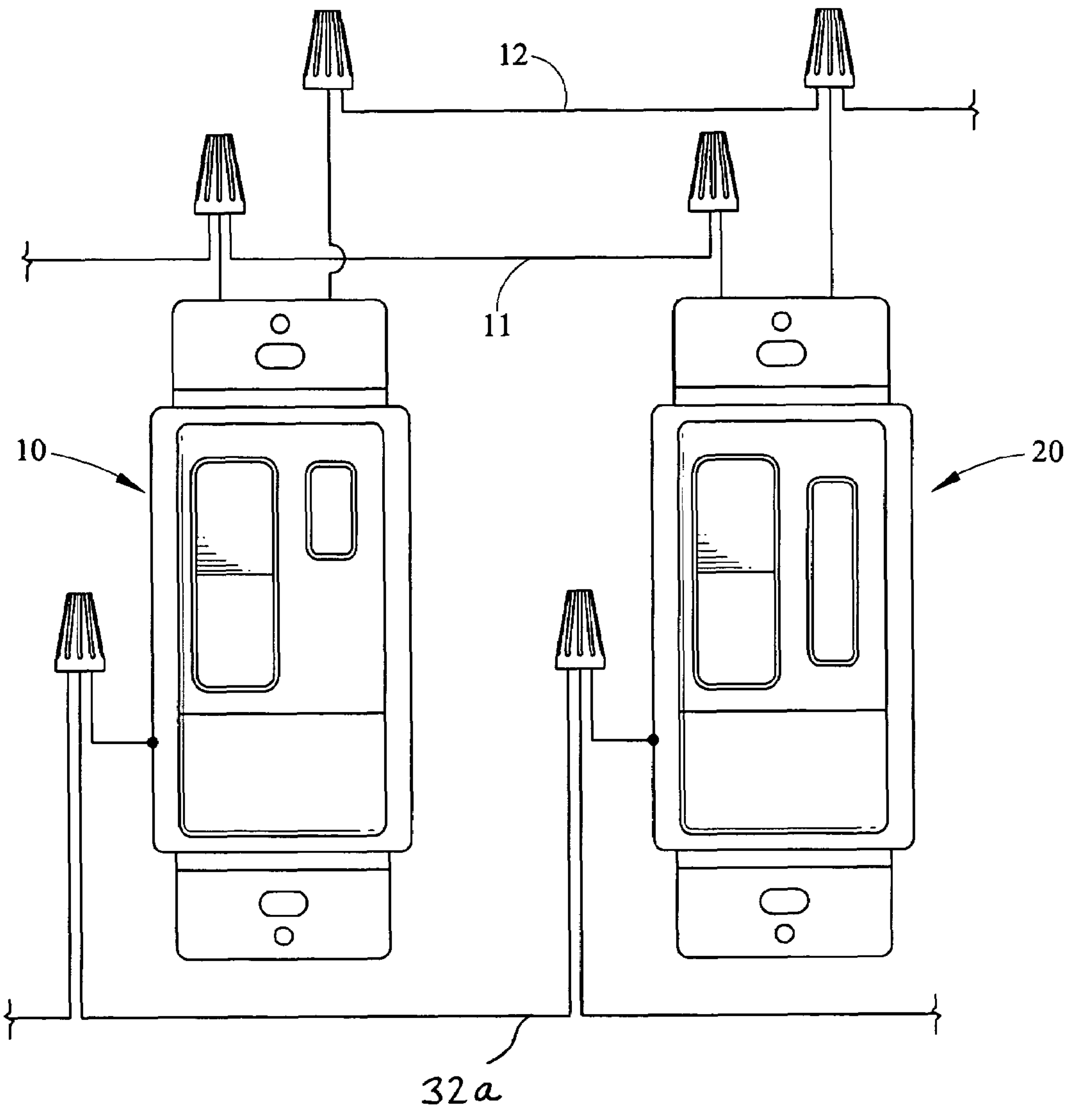
FIG. 2B is the wiring schematic for the AC powered wireless control 3-way light switch transmitter of the present invention.

As depicted in FIG. 1, the AC powered wireless control 3-way light switch transmitter 10 of the present invention is installed in a typical 3-way wiring circuit, as is shown in FIG. 2B, such that the RF transmitter light switch 10 controls the load or light fixture 30 through RF communication. The RF communication transmitted by the RF transmitter light switch 10 is received by the AC line powered RF receiver light switch 20 which can be considered the master light switch and which is connected in circuit to both the transmitter 10 and the load 30.

Reviewing FIG. 1 in light of the wiring diagram depicted in FIG. 2B, it can be appreciated that both the RF transmitter light switch 10 and the RF receiver light switch 20 are always receiving line voltage in the 3-way switch wiring depicted through travel wires 11, 12. As is further apparent from the wiring diagram shown in FIG. 2B, the RF transmitter light switch 10 of the present invention does not effectuate an actual circuit switch between line voltage and the load or light fixture 30 as is the general case for 3-way circuits of FIG. 2A.

In the present inventive wireless light switch transmitter for use in a 3-way light switch configuration, the RF transmitter light switch 10 transmits multiple signals to the RF receiver light switch 20 which then acts as a master controller for the load 30 by directly controlling the voltage to the fixture 30. Regardless of the on/off position of either the RF transmitter light switch 10 or the RF receiver light switch 20, both the receiver light switch 20 and transmitter light switch 10 are continually active in receiving line voltage through line current 'hot' wire 11 also deemed a travel wire. Further, the receiver 20 may control the load 30 by load line 12 shown. Of course, either line 11 or 12 may be alternately connected to lighting load 30. Both lines are also interconnected by ground

32*a* Thus, independent of the status of the RF switch transmitter 10, namely, the position of the light control switch located on the transmitter light switch 10, receiver light switch 20 always directly controls the load 30 even though the RF transmitter light switch 10 is interposed into a 3-way wall switch circuit.

The AC line powered RF transmitter light switch 10 of the present invention can be used to replace a mechanical toggle switch in a standard 3-way wall switch circuit. The RF transmitter light switch 10 of the present invention is a transmitting device used for remotely controlling (as in remote from the load) the room lights or other load by utilizing an RF transmission signal in combination with a compatible RF receiving device, namely the RF receiver light switch 20 which acts as the master controller of the fixture 30. The RF transmitter light switch 10 of the present invention may be capable of transmitting multiple commands through an RF carrier signal which may be used by the receiver switch to effectuate a change in the status in the light fixture 30. In the present embodiment depicted herein, the RF transmitter light switch 10 may be utilized to send commands to turn the room light or load 30 on, off or to dim the lights. However, as may be appreciated, the transmitter light switch 10 of the present invention, while always receiving AC line voltage, may communicate with the receiver light switch 20 utilizing many communication protocols and references to particular communication methodologies and protocols is felt to incorporate many other communication methods.

Figure 3:
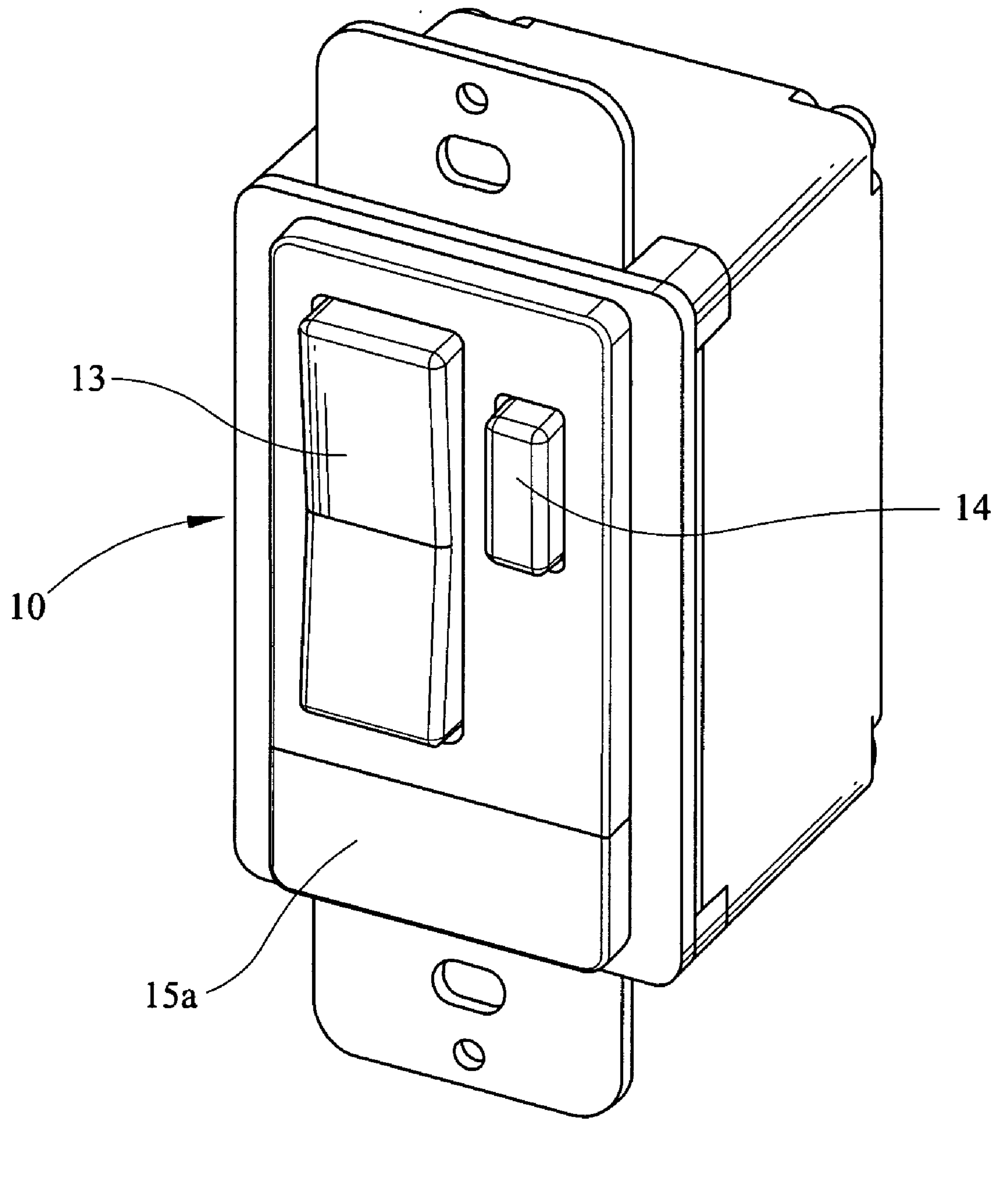
FIG. 3 is an external perspective view of the AC powered wireless control 3-way light switch transmitter of the present invention.

As shown in FIG. 3, the AC line powered RF transmitter light switch 10 of the present invention is depicted. As shown, an on/off toggle momentary switch 13 is utilized to control circuitry within the light switch to send appropriate commands to the AC line powered RF receiver light switch 20. Further, as is shown, a dim control button or switch 14 may be provided in order to dim the light fixture 30, both actuation buttons on the transmitter light switch actuating appropriate electrical controls to transmit signals to the master switch, receiver light switch 20.

Returning to FIG. 1, the AC line powered RF transmitter light switch 10 of the present invention is interconnected into the 3-way wall switch circuit shown in the drawings. However, the RF transmitter light switch 10 controls the load 30 within the 3-way wall switch circuit by emitting an RF or other type of remote communication command which is received by the master light switch connected within the same 3-way wall switch circuit. Thus, regardless of the current status of the on/off switch 13 of RF transmitter light switch 10, the RF receiving light switch 20 is continually active and receiving commands to control the load either 1) through actuation of the RF transmitter light switch 10 by the buttons located thereon or 2) by the actuation of switches located within the RF receiver light switch 20. The RF receiver light switch 20 acts as a master switch with direct control to the load 30 regardless of the status of the light switch 10. The RF receiving light switch 20 is in direct and controllable electrical connection to the light fixture 30. Further, this direct electrical connection and control of the receiver light switch 20 occurs even though the light switches in the load are connected within a 3-way wall switch circuit.

Figure 3B:
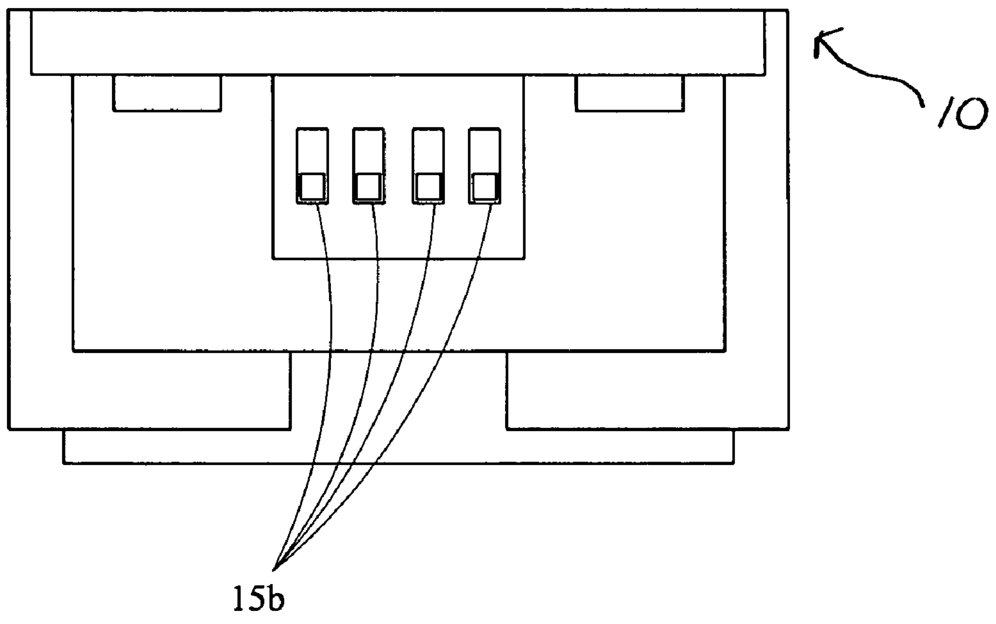
FIG. 3B is a close up view of the dip switch addressable selector for the wireless control 3-way light switch transmitter of the present invention.
Figure 5:
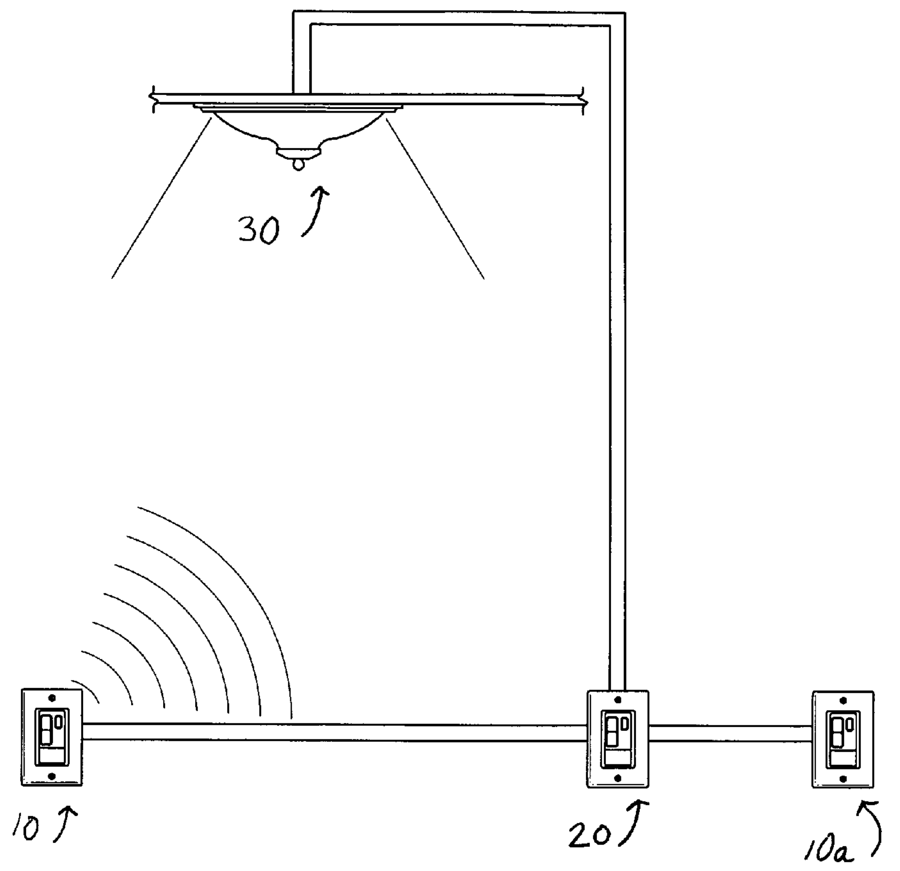
FIG. 5 is a wiring schematic for a multi-wall switch circuit wherein a plurality of AC powered wireless control 3-way light switch transmitters are utilized to communicate with a master switch.

Turning to the AC line powered RF transmitter light switch 10 which is utilized in the 3-way light switch configuration of the present invention, the RF transmitter light switch 10 is depicted in FIG. 3 wherein an on/off momentary switch 13 may be utilized. Further, an additional actuation button or switch 14 for dim control may be utilized in order to incrementally dim the fixture 30. Upon any actuation of the on or off switch 13 or of the dim control switch 14, the RF transmitter light switch 10 sends an appropriate RF signal to the RF receiver light switch 20. Further, as is depicted in FIG. 3, on the lower portion of the face plate is a dip switch cover 15*a* which provides access to a plurality of dip switches 15*b* shown in FIG. 3B. The plurality of dip switches 15*b* depicted in FIG. 3B are utilized to selectively address the RF transmitter light switch 10 and the RF receiving light switch 20. Thus, both the RF transmitter light switch 10 and RF receiving light switch 20 have a similar dip switch configuration which may be configured and must be set to a similar addressing. A plurality of both RF transmitter light switches 10, 10*a*, shown in FIG. 5, and an RF receiver light switch may be utilized within a similar or local area and may be in RF communication range but, unless the appropriate dip switch addressable setting is configured, they will not communicate appropriately with each other. Accordingly, each receiver has appropriate circuitry to demodulate addressing signals from the transmitter switch 10 or switches to make sure addressing and communication issues between appropriate switches are met.

Figure 2C:
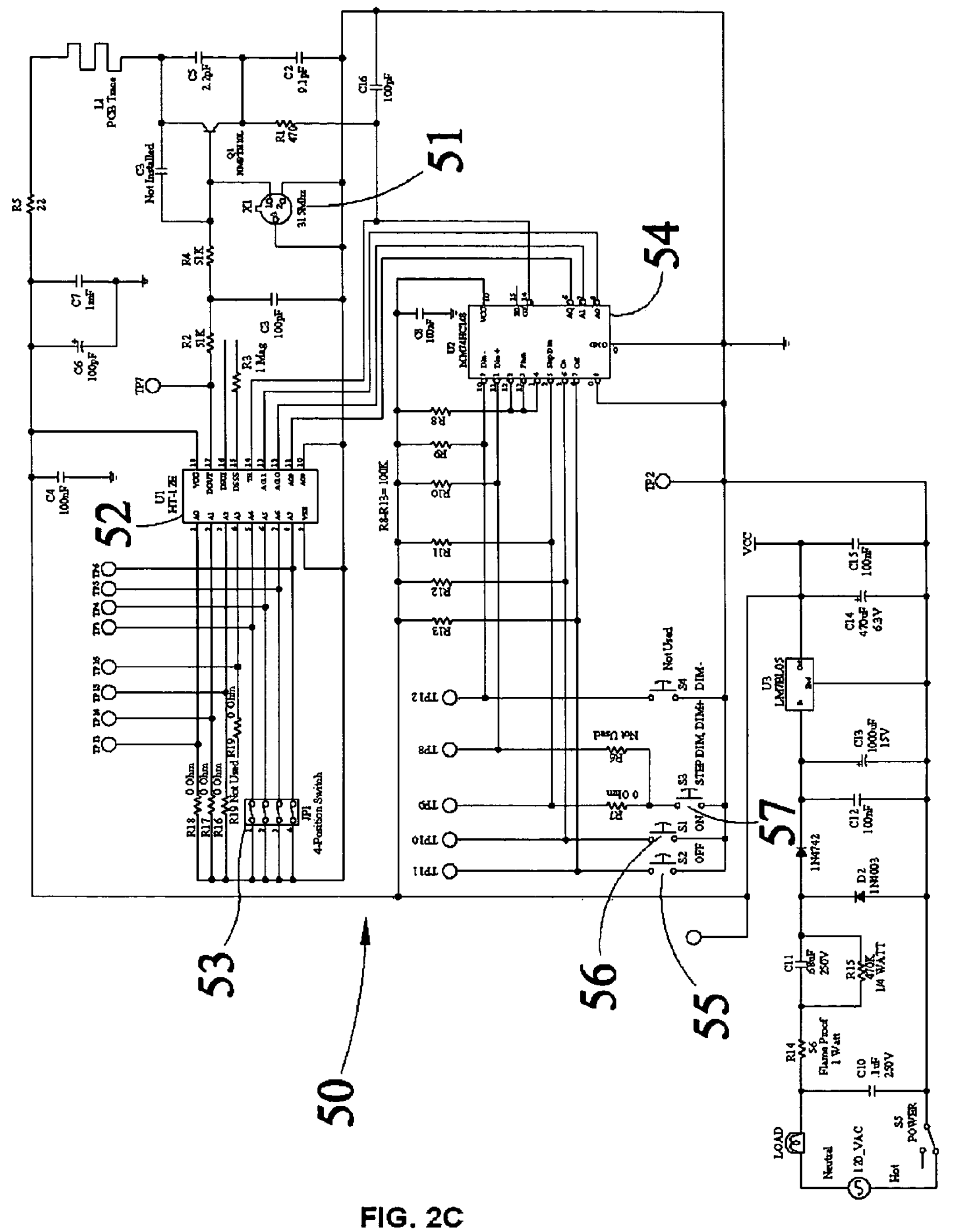
FIG. 2C is a schematic diagram for the electronic circuitry related to the AC powered wireless control 3-way light switch transmitter of the present invention.

Turning to the specifics of the AC line powered RF transmitter light switch 10 of the present invention, an exemplary line diagram for the RF transmitter light switch communication means is depicted in FIG. 2*c*. As is shown, the control or communication means 50 is depicted with the dip switches 53 mentioned corresponding to 15*b* feeding into the 12 bit DIP encoder 52 to generate the appropriate address bit outputs from the encoder 52. The system also utilizes an 8-3 line CMOS encoder 54 for interpreting the commands entered by the user, whether it be on, off or dim, from switches 55, 56, and 57 shown, each of the switches connected directly to the CMOS encoder 54 through tact or other type electronic controls. In direct electrical connection with the 12 bit DIP encoder 52 is an oscillator circuit 51 which creates an RF carrier frequency at generally about 315 MHz. In operation, the 8-3 line CMOS encoder 54 has inputs C0-C7 and outputs A0-A2. Inputted commands from switches 55, 56 and 57 are entered into input lines C5-C7. The commands are then encoded to appropriate output lines A0-A2. The encoded commands represented by A0-A2 lines feed into the 12 bit DIP encoder 52, 8 address and 4 data bits represented by the switches 55, 56, 57, shown for example as an HT-12E that works in combination with the RF transmitter circuit 51 to generate appropriate RF commands.

Overall, the control or communication means 50 is comprised of a 5-volt DC power supply which is powered directly from the AC line voltage. Three tact switches 55, 56, 57 are provided as well as the four position dip switch 53. The three tact switches 55, 56, and 57 are in direct mechanical contact with the on/off switch 13 and/or the dim control switch 14 shown in FIG. 3. The power supply may be a half wave rectifier with voltage dropping resistor/capacitor and a 5-volt regulator. The power supply circuitry, which is shown in the depiction of FIG. 2C, may be located on a rear additional or electrically connected circuit board in close proximity to the control and communication means 50. Thus, the RF and encoder circuitry of FIG. 2C may be located on a separate circuit board than the power supply. The two boards may be connected together by ribbon cable or other electrical connectivity means. Further, both electrical components may be combined on a single electrical board depending upon the particular construction necessary. None of the particular elements of the provided embodiment however are meant to be limiting and are merely shown for exemplary purposes only as many different constructions for the electrical components depicted herein are available.

In operation, the RF transmitter light switch 10 of the present invention and particularly the communication control means 50, is normally not transmitting with the RF transmitter 51 activating when one of the switches is depressed, namely the on/off switch 13 or the dim control switch 14. When one of these three normally open push buttons, represented in FIG. 2C by switch 55, 56, and 57 is depressed, one of three inputs of the 8 to 3 line encoder 54 is pulled low which supplies data to the encoder switch 52. When the circuit is complete, the encoder 52 outputs a 3 kHz 12 bit transmission to the RF oscillator circuit 51 transmitting the information at a carrier frequency of 315 MHz. The encoder 52 continues to transmit as long as the push button is depressed.

The 12 bit output of encoder 52 consists of an 8 bit address and 4 bits of data. The user selectable address, represented by the dip switches 15*b* of FIG. 3B, is set and user definable. The other four address lines may be permanently set to known values. The RF receiving light switch 20 which is controlling the load or light switch 30 is set to the same address as the RF transmitter light switch 10. Three different commands may be sent from the RF transmitter light switch in the present example to the similarly addressed receiver. In the present example, the 4 bit data code represents on, off and a dim code. When either the on, off or dim switch is depressed, the corresponding data bit is pulled low, connected to the ground via the tact switches shown in the figure. When the RF receiving light switch 20 receives and decodes the signal, it exercises direct electrical control over the light fixture 30 by either turning the fixture on, off or by dimming it as requested through standard voltage control techniques.

Figure 4:
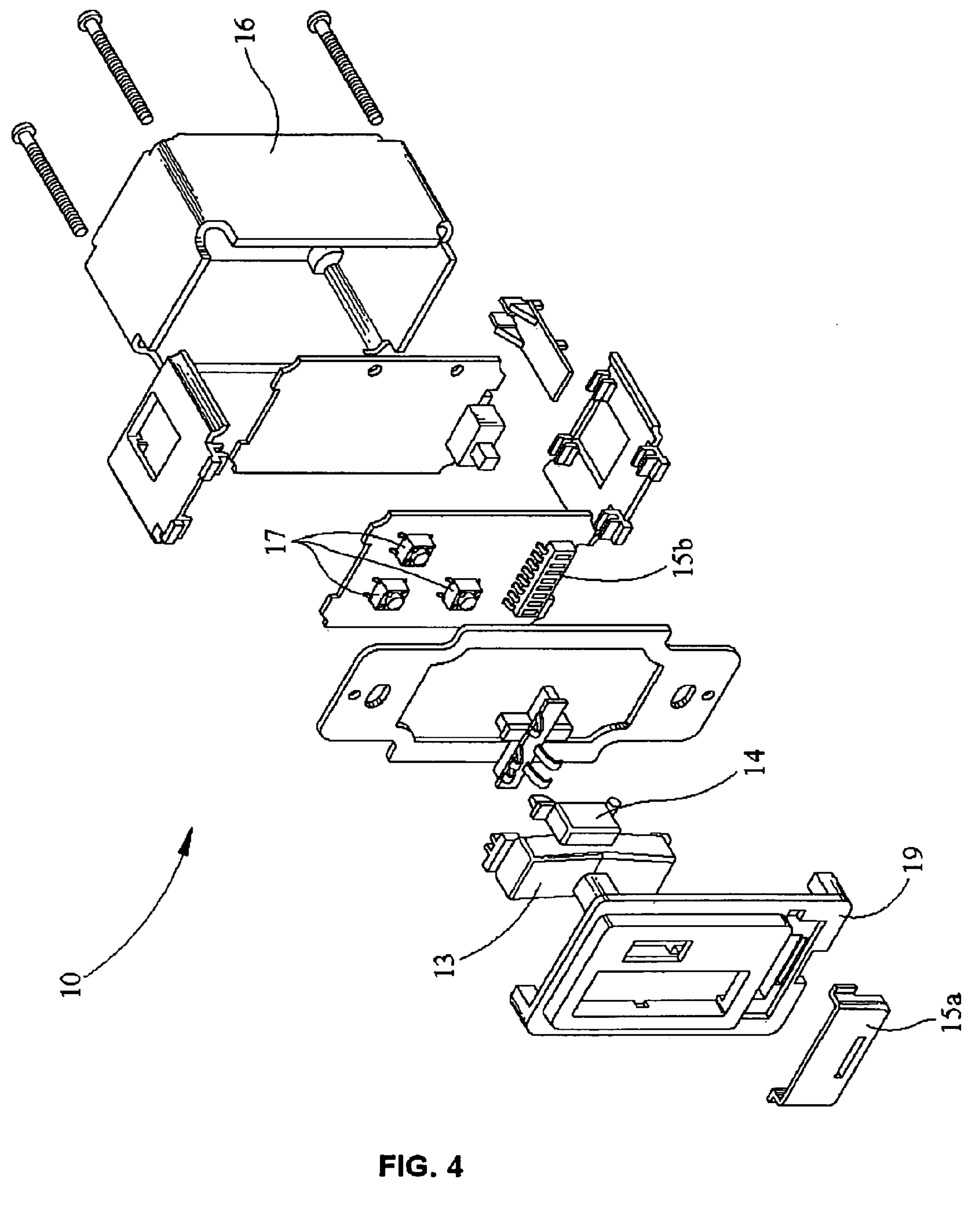
FIG. 4 is an exploded view of the AC powered wireless control 3-way light switch transmitter of the present invention.

As shown in FIG. 4, the construction of the AC line powered RF transmitter light switch 10 is of a multiple piece plastic unit with a housing 16 surrounding all of the electronics and the face plate 19 fronting the actuation switches 17 and circuit board. As previously mentioned however, multiple configurations and constructions may be utilized but in the present case, the housing 16, front cover or face plate 19 and the actuation switches 13 and 14 may be made of plastic. The entire assembly is mounted in the standard single gain junction box or housing 16.

In similar fashion, the AC line powered RF receiving light switch 20 may have electronic light control (voltage modification and regulation) circuitry, an RF receiver and actual switches to manually control the light fixture 30 as is similarly depicted in the transmitter light switch 10. In all configurations however, the AC line powered RF transmitter light switch 10 of the present invention is not in direct circuit and electronic control of the load and merely transmits the RF signal while powered within the 3-way wall switch circuit as is depicted. By integrating the AC line powered RF transmitter light switch 10 of the present invention into the 3-way wall switch circuit as shown, the light fixture 30 may be directly controlled and the RF receiving light switch is continually fed appropriate voltage regardless of the current status and actuation of switches on the RF transmitter light switch 10.

I claim:

1. A wireless light switch transmitter for use in a 3-way light switch circuit, comprising:

a transmitter electrically connected to a receiver, both said transmitter and said receiver in said 3-way light switch circuit, said receiver controlling a load, said transmitter in continual and direct electrical connection with said receiver via a first traveler wire and a second traveler wire and further in direct connection with a controlled side of the load, the transmitter and receiver being directly connected to one of a hot side of an AC voltage source or a neutral side of the AC voltage source, the connection to the neutral side being made through the load and not through the receiver such that at least some voltage is maintained at all times between the first traveler wire and the second traveler wire, the at least some voltage being effective to provide a sufficient amount of power to operate an electronic component at the transmitter;

said transmitter having an RF transmitter for transmitting RF signals including an address and data signal to said receiver and controlling the status of the load by the RF signals;

a first on/off switch on said transmitter and a second on/off switch on said receiver and a first dim selection switch on said transmitter and a second dim selection switch on said receiver, said first on/off switch and said first dim selection switch electrically on said transmitter connected to said RF transmitter in order to electronically transmit the RF signals to said receiver.

2. The wireless light switch transmitter of claim 1 wherein said first on/off switch is a momentary switch.

3. The wireless light switch transmitter of claim 1 wherein said first dim selection switch is a push button.

4. The wireless light switch transmitter of claim 1 wherein said transmitter has an RF oscillator circuit.

5. The wireless light switch transmitter of claim 4 further having at least two address dip switches for said address signal and further wherein said data signal is selected from the group: on; off or dim.

6. The wireless light switch transmitter of claim 4 wherein said oscillator circuit generates an RF carrier frequency at about 315 MHz and further includes a 12 bit encoder.

7. The wireless light switch transmitter of claim 1 wherein said receiver is address settable.

8. The wireless light switch transmitter of claim 1 wherein said receiver further has at least two address dip switches.

9. The wireless light switch transmitter of claim 1 wherein said receiver and said transmitter utilize RF signal communication.

10. The wireless light switch transmitter of claim 1 wherein said receiver electrically controls said load.

11. The wireless light switch transmitter of claim 10 wherein said load is a light fixture.

12. The wireless light switch transmitter of claim 1 wherein said transmitter outputs an RF signal representing an eight bit address and a four bit data signal.

13. The wireless light switch transmitter of claim 12 wherein said data signal represents an on, off or dim instruction.

14. A wireless 3-way light switch system comprising:

a light fixture connected to an RF transmitter light switch and an RF receiver light switch, wherein said RF transmitter light switch is continually electrically connected to said RF receiver light switch via a first traveler wire and a second traveler wire and directly connected to a controlled side of the light fixture, wherein the RF receiver light switch is in controllable connection to the light fixture and wherein the RF transmitter light switch and the RF receiver light switch are directly connected to a hot side of an AC voltage source, a connection of the RF transmitter light switch to a neutral side of the AC voltage source being made through the light fixture and not through the RF receiver light switch, wiring in the 3-way light switch system maintaining AC voltage between the first traveler wire and the second traveler wire, the AC voltage being effective to provide a sufficient amount of power to operate an electronic component at the transmitter.

15. The wireless 3-way light switch system of claim 14 wherein said RF transmitter light switch and said RF receiver light switch both have an on/off switch, a dim switch and a user definable address code and further wherein said RF transmitter light switch has an RE transmitter.

16. The wireless 3-way light switch system of claim 14 wherein said RF receiver is in controllable electrical connection with said light fixture and operable to control said fixture in response to RF signals from said RF transmitter.

17. The wireless 3-way light switch system of claim 14 wherein said RF receiver light switch is continually connected to line voltage in parallel with said RF transmitter light switch.

18. The wireless 3-way light switch system of claim 17 wherein said line voltage is 120 VAC at 60 Hz.

19. The wireless 3-way light switch system of claim 14 wherein said user definable address code on said RF transmitter light switch is a plurality of dip switches.

20. The wireless 3-way light switch system of claim 19 wherein said plurality of dip switches is a four position dip switch.

21. The wireless 3-way light switch system of claim 14 wherein said RF transmitter is electrically operable to transmit RF data signals representing on, off or dim.

22. The wireless 3-way light switch system of claim 21 wherein said RF transmitter emits a 12 bit RF output signal.

23. The wireless 3-way light switch system of claim 22 wherein said 12 bit output signal represents at least a four bit address and a four bit data signal.

24. The wireless 3-way light switch system of claim 23 wherein said output signal is sent on an RF carrier frequency of about 315 MHz.

25. The wireless 3-way light switch system of claim 14 wherein said RF transmitter has a 315 MHz RF oscillator.

26. The wireless 3-way light switch system of claim 25 wherein said RF oscillator transmits when said on/off switch or said dim switch is actuated.

27. The wireless 3-way light switch system of claim 26 wherein said RF oscillator is electronically connected to a CMOS 12 bit encoder, said encoder actuated upon the actuation of said on/off switch or said dim switch to output a 12 bit signal to said RF oscillator.

28. A 3-way wireless light switch system, comprising:

an RF transmitter light switch and an RF receiver light switch;

a first electrical wire in electrical connection to a hot side of a line voltage source and not to a neutral side of the line voltage source, said first electrical wire also in connection with said RF transmitter light switch and said RF receiver light switch;

a second electrical wire in direct electrical connection with a light fixture, said RF transmitter light switch and said RF receiver light switch;

a third electrical wire in connection with the neutral side of the line voltage source and the light fixture and not connected to the RF transmitter light switch and the RF receiver light switch, the RF transmitter light switch in constant electrical connection with the RF receiver light switch and the RF receiver light switch is in controllable electrical connection to the light fixture to maintain AC voltage between the first electrical wire and the second electrical wire, the AC voltage being effective to provide a sufficient amount of power to operate an electronic component at the transmitter.

29. The 3-way wireless light switch system of claim 28 wherein said RF transmitter light switch has an RF transmitter.

30. The 3-way wireless light switch system of claim 29 wherein said RF transmitter has an RF oscillator circuit.

31. The 3-way wireless light switch system of claim 30 further having an encoder in electronic connectivity with said RF oscillator circuit.

32. The 3-way wireless light switch system of claim 28 wherein said RF transmitter light switch and said RF receiver light switch both have an on/off actuation switch and a dim switch to actuate said fixture.

33. The 3-way wireless light switch system of claim 28 wherein said RF transmitter light switch and said RF receiver light switch both have at least a four position dip switch.

34. A method of implementing a wireless command 3-way light switch system, comprising:

electrically connecting a hot line to an RF transmitter switch and an RF receiver switch;

electrically connecting a travel wire directly to said RF transmitter switch, said RF receiver switch and to a light fixture;

electrically connecting a neutral line to the light fixture, wherein the RF transmitter and RF receiver are not connected to the neutral line;

electronically controlling said light fixture operation through said RF receiver switch;

wirelessly communicating through an RF carrier frequency instructions from said RF transmitter switch to said RF receiver switch upon actuation of said RF transmitter switch; and maintaining AC voltage between the traveler wire and the hot wire, the AC voltage being effective to provide a sufficient amount of power to operate an electronic component at the wireless transmitter.

35. The method of implementing a wireless command 3-way light switch system of claim 34 wherein said RF carrier frequency instructions are on, off or dim.

36. The method of implementing a wireless command 3-way light switch system of claim 34 further comprising defining a unique four bit address for both said RF receiver switch and said RF transmitter switch.

37. The method of implementing a wireless command 3-way light switch system of claim 34 wherein said communication step further includes providing a multi-bit data transmission from an encoder to an RF oscillator.

38. The method of implementing a wireless command 3-way light switch system of claim 37 wherein said multi-bit data transmission is a 3 kHz 12 bit transmission.

39. The method of implementing a wireless command 3-way light switch system of claim 38 wherein said RF oscillator operates at a frequency of about 315 MHz.

40. The method of implementing a wireless command 3-way light switch system of claim 34 wherein both said RF transmitter switch and said RF receiver switch actuate said light fixture.

41. The method of implementing a wireless command 3-way light switch system of claim 40 wherein said RF transmitter switch actuates said light fixture through said instructions.

42. The method of implementing a wireless command 3-way light switch system of claim 40 wherein said RF receiver switch may actuate said light fixture after interpreting said commands from said RF transmitter switch.

* * * * *

UNITED STATES PATENT AND TRADEMARK OFFICE

CERTIFICATE OF CORRECTION

PATENT NO. : 7,656,308 B2
APPLICATION NO. : 10/975652
DATED : February 2, 2010
INVENTOR(S) : Barry L. Atkins It is certified that error appears in the above-identified patent and that said Letters Patent is hereby corrected as shown below:

Column 7, Claim 16, Line 3: Change "an RE" to -- an RF --.

Signed and Sealed this

First Day of June, 2010

David J. Kappos
*Director of the United States Patent and Trademark Office*

UNITED STATES PATENT AND TRADEMARK OFFICE

CERTIFICATE OF CORRECTION

PATENT NO. : 7,656,308 B2
APPLICATION NO. : 10/975652
DATED : February 2, 2010
INVENTOR(S) : Barry L. Atkins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this

Thirtieth Day of November, 2010

David J. Kappos

*Director of the United States Patent and Trademark Office*